US012438575B2

(12) United States Patent
Ahmadian Tehrani et al.

(10) Patent No.: US 12,438,575 B2
(45) Date of Patent: Oct. 7, 2025

(54) APPARATUSES AND METHODS FOR SPATIAL BEAM PREDICTION WITH MULTIPLE ASSISTANCE INFORMATION

(71) Applicant: Nokia Technologies Oy, Espoo (FI)

(72) Inventors: Amir Ahmadian Tehrani, Munich (DE); Sajad Rezaie, Aalborg (DK); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 59 days.

(21) Appl. No.: 18/507,852

(22) Filed: Nov. 13, 2023

(65) Prior Publication Data

US 2024/0162943 A1 May 16, 2024

(30) Foreign Application Priority Data

Nov. 14, 2022 (FI) ...................................... 20226023

(51) Int. Cl.
*H04B 7/02* (2018.01)
*G06N 20/00* (2019.01)
*H04B 7/0417* (2017.01)
*H04B 7/0456* (2017.01)
*H04B 7/06* (2006.01)

(52) U.S. Cl.
CPC ........... *H04B 7/0417* (2013.01); *G06N 20/00* (2019.01); *H04B 7/046* (2013.01); *H04B 7/063* (2013.01)

(58) Field of Classification Search
CPC ...... H04B 7/0417; H04B 7/046; H04B 7/063; G06N 20/00

USPC ................ 375/267, 260, 259, 219, 295, 316
See application file for complete search history.

(56) References Cited

U.S. PATENT DOCUMENTS

| | | | |
|---|---|---|---|
| 2020/0259575 A1 | 8/2020 | Bai et al. | |
| 2023/0057661 A1* | 2/2023 | Awoniyi-Oteri | ...... H04W 24/08 |
| 2025/0016758 A1* | 1/2025 | Li | ....................... H04W 72/046 |

FOREIGN PATENT DOCUMENTS

| | | |
|---|---|---|
| WO | 2019/133353 A1 | 7/2019 |
| WO | 2022/013093 A1 | 1/2022 |

OTHER PUBLICATIONS

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.
"New SI: Study on Artificial Intelligence (AI)/Machine Learning (ML) for NR Air Interface", 3GPP TSG RAN Meeting #94e, RP-213599, Agenda Item: 8.6.1, Qualcomm, Dec. 6-17, 2021, 6 pages.

(Continued)

*Primary Examiner* — Zewdu A Kassa
(74) *Attorney, Agent, or Firm* — Barta Jones, PLLC

(57) ABSTRACT

Example embodiments provide improved spatial beam predictions based on multiple assistance information parameters. An apparatus may be configured to configure a plurality of subspaces and corresponding machine learning models based on a dataset comprising multiple assistance information parameters, select a subset of the subspaces for inference by the machine learning models based on available assistance information, and determine a preferred spatial beam prediction based on the inferences. Apparatuses, methods, and computer programs are disclosed.

9 Claims, 7 Drawing Sheets

(56) References Cited

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

IEEE 802.11, Wikipedia, Retrieved on Mar. 11, 2024, Webpage available at : https://en.wikipedia.org/wiki/IEEE_802.11.

Office Action received for corresponding Finnish Application No. 20226023, dated May 5, 2023, 9 pages.

"Other aspects on AI/ML for beam management", 3GPP TSG-RAN WG1 #110-bis-e, R1-2209979, Agenda item: 9.2.3.2, Qualcomm Incorporated, Oct. 10-19, 2022, pp. 1-4.

"Other aspects on ML for beam management", 3GPP TSG RAN WG1 #111 meeting, R1-2212330, Agenda item: 9.2.3.2, Nokia, Nov. 14-18, 2022, 23 pages.

Extended European Search Report received for corresponding European Patent Application No. 23198568.0, dated Mar. 12, 2024, 9 pages.

"Discussion on AI/ML for beam management", 3GPP TSG-RAN WG1 Meeting #110-bis-e, R1-2208907, Agenda Item: 9.2.3.2, Ericsson, Oct. 10-19, 2022, 14 pages.

\* cited by examiner

APPARATUSES AND METHODS FOR SPATIAL BEAM PREDICTION WITH MULTIPLE ASSISTANCE INFORMATION

TECHNICAL FIELD

The present application generally relates to information technology. In particular, some example embodiments of the present application relate to spatial beam prediction with multiple assistance information.

BACKGROUND

Operations for supporting beamforming transmission include beam sweeping, beam measurements and reporting, beam maintenance and recovery. Beam management has evolved to support more advanced configurations such as multi-beam reporting to enable multiple transmission-reception points (multi-TRPs) and multi-panel configurations. However, with a larger number of beams supported by high-dimensional MIMO (multiple input, multiple output) arrays, CSI-RS (channel state information reference signal) measurements and feedback overhead may radically increase to enable beam selection. In addition, the time required for a base station and a client node to complete the beam sweeping and establish the best beam increases accordingly. Thus, support of low latency communication may be limited.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable spatial beam prediction based on multiple assistance information parameters reported by a base station or a client node. This may be achieved by the features of the independent claims. Further implementation forms are provided in the dependent claims, the description, and the drawings.

According to a first aspect, an apparatus may comprise at least one processor; and at least one memory comprising instructions which, when executed by the at least one processor, cause the apparatus at least to configure subspaces and corresponding machine learning models trained for spatial beam prediction based on a dataset comprising multiple assistance information parameters associated with a base station or a client node, wherein the number of configured subspaces depends on the number of the assistance information parameters and a plurality of the subspaces comprise at least one of the multiple assistance information parameters; select a subset of the subspaces based on predefined selection probabilities of the subspaces; send a request to report one or more of the multiple assistance information parameters to the base station or to the client node; obtain first inputs for the machine learning models comprising beam measurements; obtain second inputs for the machine learning models comprising available assistance information parameters received from the base station or the client node based on the request; execute one or more machine learning models based on the first and the second inputs with respect to the subset of subspaces, wherein subspaces comprised in the plurality of subspaces and not comprising one or more of the available assistance information parameters are excluded from the execution; select a preferred output for the spatial beam prediction among the outputs of the executed machine learning models based on a predetermined selection method; and determine at least one of a downlink transmission beam alignment or a reception beam alignment based on the preferred output.

According to an example embodiment of the first aspect, the apparatus comprises the base station and wherein the at least one memory further comprises instructions which, when executed by the at least one processor, cause the apparatus to send to the client node a configuration comprising parameters for the beam measurements and the request; and wherein the first and the second inputs are received from the client node based on the configuration.

According to an example embodiment of the first aspect, the apparatus comprises the base station and the request is sent to the client node via radio resource control, RRC.

According to an example embodiment of the first aspect, the configuration comprises at least one of reporting resources or a reporting periodicity for the beam measurements and/or the requested assistance information parameters.

According to an example embodiment of the first aspect, the apparatus comprises the client node, and the request is sent to the base station and the beam measurements are performed by the client node.

According to an example embodiment of the first aspect, the request comprises a list of preferred assistance information parameters to be reported based on the selected subset of subspaces.

According to an example embodiment of the first aspect, the at least one memory further comprises instructions which, when executed by the at least one processor, cause the apparatus to determine prediction accuracy based on a connection status and a quality of link of the transmission and reception beam alignment; compare the prediction accuracy to a predefined threshold; update the selection probabilities of the subspaces by decreasing the selection probability of the subspace corresponding to the selected output when the prediction accuracy is below the threshold and by increasing the selection probability of the current subset of subspaces when the prediction accuracy is equal to or above the threshold; and reselect the subset of subspaces based on the updated selection probabilities of subspaces.

According to an example embodiment of the first aspect, the at least one memory further comprises instructions which, when executed by the at least one processor, cause the apparatus to update a periodicity of the beam measurements based on the updated subset of subspaces; and provide the updated periodicity to at least one of the base station or the client node.

According to an example embodiment of the first aspect, the number of configured subspaces is reduced by excluding one or more of the multiple assistance information parameters based on giving similar information than one of the other multiple assistance information parameters.

According to a second aspect, an apparatus may comprise at least one processor; and at least one memory comprising instructions which, when executed by the at least one processor, cause the apparatus at least to receive, by a base station from a client node or by the client node from the base station, a request to report multiple assistance information parameters; and report, to the client node or to the base station, available assistance information parameters measured based on the request.

According to an example embodiment of the second aspect, the at least one memory may further comprise instructions which, when executed by the at least one processor, cause the apparatus to receive, by the client node, the request from the base station in a configuration comprising parameters for reporting beam measurements; and send, to the base station, the beam measurements and the available assistance information based on the configuration.

According to an example embodiment of the second aspect, the at least one memory may further comprise instructions which, when executed by the at least one processor, cause the apparatus to send, with the beam measurements and the available assistance information of the client node, a second request to report multiple assistance information parameters by the base station; and receive, from the base station, available assistance information parameters measured based on the second request.

According to an example embodiment of the second aspect, the request may comprise a list of preferred assistance information parameters to be reported, and the report comprises only the available assistance information parameters comprised in the list.

According to a third aspect, a method may comprise configuring subspaces and corresponding machine learning models trained for spatial beam prediction based on a dataset comprising multiple assistance information parameters associated with a base station or a client node, wherein the number of configured subspaces depends on the number of the assistance information parameters and a plurality of the subspaces comprise at least one of the multiple assistance information parameters; selecting a subset of the subspaces based on predefined selection probabilities of the subspaces; sending a request to report one or more of the multiple assistance information parameters to the base station or to the client node; obtaining first inputs for the machine learning models comprising beam measurements; obtaining second inputs for the machine learning models comprising available assistance information parameters received from the base station or the client node based on the request; executing one or more machine learning models based on the first and the second inputs with respect to the subset of subspaces, wherein subspaces comprised in the plurality of subspaces and not comprising one or more of the available assistance information parameters are excluded from the execution; selecting a preferred output for the spatial beam prediction among the outputs of the executed machine learning models based on a predetermined selection method; and determining at least one of a downlink transmission beam alignment or a reception beam alignment based on the preferred output.

According to an example embodiment of the third aspect, the method may comprise sending, by the base station to the client node, a configuration comprising parameters for the beam measurements and the request; and wherein the first and the second inputs are received from the client node based on the configuration.

According to an example embodiment of the third aspect, the request may be sent, by the base station to the client node, via radio resource control, RRC.

According to an example embodiment of the third aspect, the configuration may comprise at least one of reporting resources or a reporting periodicity for the beam measurements and/or the requested assistance information parameters.

According to an example embodiment of the third aspect, the request may be sent by the client node to the base station and the beam measurements may be performed by the client node.

According to an example embodiment of the third aspect, the request may comprise a list of preferred assistance information parameters to be reported based on the selected subset of subspaces.

According to an example embodiment of the third aspect, the method may comprise determining prediction accuracy based on a connection status and a quality of link of the transmission and reception beam alignment; comparing the prediction accuracy to a predefined threshold; updating the selection probabilities of the subspaces by decreasing the selection probability of the subspace corresponding to the selected output when the prediction accuracy is below the threshold and by increasing the selection probability of the current subset of subspaces when the prediction accuracy is equal to or above the threshold; and reselecting the subset of subspaces based on the updated selection probabilities of subspaces.

According to an example embodiment of the third aspect, the method may comprise updating a periodicity of the beam measurements based on the updated subset of subspaces; and providing the updated periodicity to at least one of the base station or the client node.

According to an example embodiment of the third aspect, the method may comprise reducing the number of configured subspaces by excluding one or more of the multiple assistance information parameters based on giving similar information than one of the other multiple assistance information parameters.

According to a fourth aspect, a method may comprise receiving, by a client node or a base station, a request to report multiple assistance information parameters; and reporting, to the base station or to the client node, available assistance information parameters based on the request.

According to an example embodiment of the fourth aspect, the method may comprise receiving, by the client node, the request from the base station in a configuration comprising parameters for reporting beam measurements; and sending, by the client node to the base station, the beam measurements and the available assistance information based on the configuration.

According to an example embodiment of the fourth aspect, the method may comprise sending, with the beam measurements and the available assistance information of the client node, a second request to report multiple assistance information parameters by the base station; and receiving, by the client node from the base station, available assistance information parameters measured based on the second request.

According to an example embodiment of the fourth aspect, the request may comprise a list of preferred assistance information parameters to be reported, and the report comprises only the available assistance information parameters comprised in the list.

According to a fifth aspect, a computer program may be configured, when executed by a processor, to cause an apparatus at least to perform the following: configuring subspaces and corresponding machine learning models trained for spatial beam prediction based on a dataset comprising multiple assistance information parameters associated with a base station or a client node, wherein the number of configured subspaces depends on the number of the assistance information parameters and a plurality of the subspaces comprise at least one of the multiple assistance information parameters; selecting a subset of the subspaces based on predefined selection probabilities of the subspaces; sending a request to report one or more of the multiple assistance information parameters to the base station or to the client node; obtaining first inputs for the machine learning models comprising beam measurements; obtaining second inputs for the machine learning models comprising available assistance information parameters received from the base station or the client node based on the request; executing one or more machine learning models based on the first and the second inputs with respect to the subset of subspaces, wherein subspaces comprised in the plurality of subspaces and not comprising one or more of the available assistance information parameters are excluded from the execution; selecting a preferred output for the spatial beam prediction among the outputs of the executed machine learning models based on a predetermined selection method; and determining at least one of a downlink transmission beam alignment or a reception beam alignment based on the preferred output. The computer program may further comprise instructions for causing the apparatus to perform any example embodiment of the method of the third aspect.

According to a sixth aspect, an apparatus may comprise means for configuring subspaces and corresponding machine learning models trained for spatial beam prediction based on a dataset comprising multiple assistance information parameters associated with a base station or a client node, wherein the number of configured subspaces depends on the number of the assistance information parameters and a plurality of the subspaces comprise at least one of the multiple assistance information parameters; selecting a subset of the subspaces based on predefined selection probabilities of the subspaces; sending a request to report one or more of the multiple assistance information parameters to the base station or to the client node; obtaining first inputs for the machine learning models comprising beam measurements; obtaining second inputs for the machine learning models comprising available assistance information parameters received from the base station or the client node based on the request; executing one or more machine learning models based on the first and the second inputs with respect to the subset of subspaces, wherein subspaces comprised in the plurality of subspaces and not comprising one or more of the available assistance information parameters are excluded from the execution; selecting a preferred output for the spatial beam prediction among the outputs of the executed machine learning models based on a predetermined selection method; and determining at least one of a downlink transmission beam alignment or a reception beam alignment based on the preferred output. The apparatus may further comprise means for performing any example embodiment of the method of the third aspect.

According to a seventh aspect, a computer program may comprise instructions for causing an apparatus to perform at least the following: receiving, by a client node or a base station, a request to report multiple assistance information parameters; and reporting, to the base station or to the client node, available assistance information parameters based on the request. The computer program may further comprise instructions for causing the apparatus to perform any example embodiment of the method of the fourth aspect.

According to an eighth aspect, an apparatus may comprise means for receiving, by a client node or a base station, a request to report multiple assistance information parameters; and reporting, to the base station or to the client node, available assistance information parameters based on the request. The apparatus may further comprise means for performing any example embodiment of the method of the fourth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

DETAILED DESCRIPTION

Figure 1:
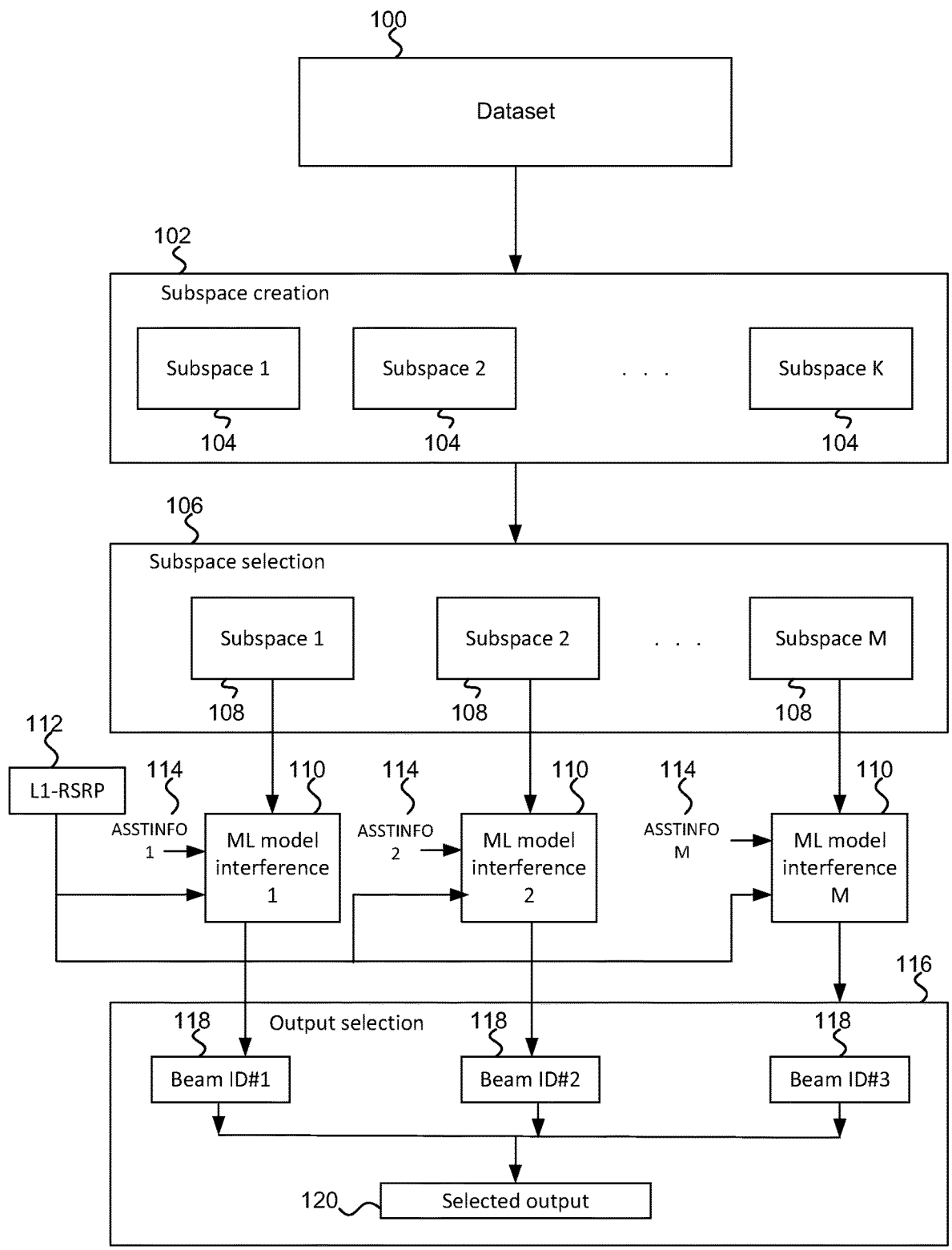
FIG. 1 illustrates an example flowchart for spatial beam prediction using multiple assistance information parameters according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Problems occurring in beam management procedures with a larger number of beams supported by high-dimensional MIMO arrays is mainly due to the frequency of SSB/CSI-RS transmission during P1, P2, P3 procedures for beam management, for example in a 5G, a 5G-advanced or a 6G communication network, summarized as follows:

The P1 procedure may provide beam sweeping implemented for a base station to scan a coverage area periodically by transmitting SSBs with wide angular beams. Further, a client node may scan different SSB s to identify the best beam and corresponding time/frequency resources on which to request access.

During the P2 procedure, the base station may perform beam refinement by transmitting CSI-RS s with narrow beams to identify a more precise direction towards the client node after establishing the wide beam in P1.

During the P3 procedure, beam refinement may be implemented at the client node side to scan a set of reception narrow beams while the base station transmits CSI-RSs using the best beam identified in P2.

The procedures P1, P2 and P3 may be executed sequentially to establish data transmission between the base station and the client node, and in case of beam failure and recovery the procedures may be fully repeated. In addition, procedures P2 and P3 may be also periodically repeated for beam maintenance.

Beam management, such as beam prediction in time, and/or in spatial domain for overhead and latency reduction, or beam selection for accuracy improvement, may be implemented with artificial intelligence (AI) or machine learning (ML). The primary motivation for supporting AI/ML-based beam management is overhead savings and latency reduction. For example, ML algorithms may enable predicting a serving beam for different client node locations and time instances, thus avoiding measuring the actual beam quality and saving those resources to be employed for data transmission.

On the other hand, beam scanning operations, like those performed in the procedures P1, P2 and P3, may be time inefficient and not scalable when the size of antenna arrays increases. Therefore, ML algorithms may be used to replace sequential beam scanning, for example, by recommending a reduced set of beams likely to contain a preferred beam index of the full scan.

Beam prediction in time may refer to a broad range of ML approaches that predict the next beam to use. Therefore, the preferred beam to use in successive time instances may be predicted with the ML approaches. On the other hand, spatial domain ML approaches may infer the preferred beam in different spatial locations. Further, approaches considering improving beam selection accuracy may concentrate on system performance aspects such as reliability and outage, targeting more specific applications.

For example, spatial-domain DL (downlink) beam prediction may be used for a first set of beams based on measurement results of a second set of beams. For example, a subset of narrow beam measurements may be used to predict the preferred narrow beam at the client node side which may lead to avoiding measuring all narrow beams. The base station may configure the client node to get a measurement report only from the subset of beams while excluding the other beams from the set of measurements.

For example, if a neural-network beam prediction model is implemented at the base station side, instead of transmitting a large number of reference signals like SSBs and CSI-RS s, the client node may report only a few beams. Thereafter, a ML model at the base station may be configured to compute parameters like CRI and RSRP to be used as input data of the ML model. In addition, assistance information (ASSTINFO) from the client node can be added to the ML model input if available. Finally, a list of ranked beams and available RSRP values may be added to a beam reporting message sent back from the client node to the base station. In this example, the base station may execute the ML model prediction locally and provide a list of CRI associated with K beams. The list may contain both measured beams and predicted beams, which are ranked, for instance, in a descending order from the most likely preferred beam to the less likely preferred beam.

Inputs to a ML model may comprise, for example, L1-RSRP measurements based on the second set of beams. In addition to L1-RSRP, additional inputs to ML model, such as ASSTINFO, may be used to enhance beam prediction in spatial domain. The ASSTINFO may comprise, for example, Tx and/or Rx beam shape information (e.g., Tx and/or Rx beam pattern, Tx and/or Rx beam boresight direction (azimuth and elevation), 3 dB beamwidth, etc.), expected Tx and/or Rx beam for the prediction (e.g., expected Tx and/or Rx angle, Tx and/or Rx beam ID for the prediction), UE (user equipment) position information, UE direction information, Tx beam usage information, UE orientation information, and the like.

ASSTINFO in spatial-domain DL beam prediction can be utilized according to the following use cases, for example:

Common ASSTINFO may be used for a client node side ML model and a base station side ML model, wherein the same set of ASSTINFO is used at both sides as inputs to the respective ML model.

Specific ASSTINFO may be used for a client node side ML model, wherein a specific set of ASSTINFO is used at the client node side ML model as inputs to the ML model. Base station side beam shape information including beam boresight directions are examples of ASSTINFO in this case.

Specific ASSTINFO may be used for a base station side ML model, wherein a specific set of ASSTINFO is used at the base station side ML model as inputs to the ML model. Client node location, client node expected Rx beam ID and/or angle and client node moving direction are examples of ASSTINFO in this case.

However, selecting one specific ASSTINFO as an input for a ML model may not lead to an optimal solution due to the following reasons:

All client nodes may not share one specific ASSTINFO due to a concern of disclosing proprietary/privacy information. Further, it has been unclear how a combination of ASSTINFO can be designed and benefits ML model using ASSTINFO in the end or how to consider generalization aspects (e.g., different environment, different applications) during ML model inference using ASSTINFO.

An objective is to resolve above issues via employing subspaces of supporting single and/or multiple ASSTINFOs where only one and/or a few subsets of ML models corresponding to the selected subspaces are used to speed up inference time. Moreover, subspace selection methods based on prediction performance and available ASSTINFO are used to improve the inference accuracy and time without the need for including all the ASSTINFOs during inference of the ML models.

According to an example embodiment, an apparatus may be configured to create subspaces from available training dataset based on one or more conditions. The subspaces may be created, for example, based on a number of reported ASSTINFO parameters associated with the dataset. The apparatus may be configured to select one or more of the subspaces based on predefined selection probabilities of subspaces, which may be updated based on model learning. The apparatus may be configured to select an output for spatial beam prediction based on outputs of one or more executed machine learning models, for example, based on a predetermined voting method. The machine learning models to be executed may be determined based on received ASSTINFO parameters and selected subspaces associated with the received ASSTINFO parameters. The received ASSTINFO parameters may be based on a provided list of preferred ASSTINFO parameters to be reported such that only ASSTINFO available from the list may be measured and reported. Hence, reporting unnecessary parameters may be avoided. The output may be used by the apparatus to determine a downlink transmission and/or reception beam.

Further, the apparatus may be configured to evaluate the output, and update the selected subspaces based on the evaluation. The apparatus may comprise a device of a communication network, such as a base station or a client node.

Advantages of example embodiments may comprise providing a framework for communicating available and preferred ASSTINFO for ML-based beam management between two devices, such as a client node and a base station. Further, adaptive subspace selection in response to the evaluation, for example based on a link success/failure status and a quality of the deployed link, is provided. In addition, energy and resource saving may be achieved by efficiently selecting a most useful ASSTINFO such that unnecessary ASSTINFO may not be reported, for example, based on an obtained list of preferred ASSINFO parameters. This enables that sensors for measuring other ASSTINFO may be turned off, for example.

In a first example, a base station may be assumed to be capable of performing DL Tx-beam and/or Rx-beam prediction in the spatial domain by using an AI/ML model where it predicts ranking of preferred DL Tx-beam and/or Rx-beam identifiers (IDs) based on a subset of actual beam measurements and additionally using assistance information (ASSTINFO) from a client node side. Furthermore, AI/ML model training and validation may be performed separately by the base station.

In a second example, a client node may be assumed to be capable of performing DL Tx-beam and/or—Rx-beam prediction in the spatial domain by using an AI/ML model where it predicts ranking of preferred DL Tx-beam and/or—Rx-beam IDs based on a subset of actual beam measurements and additionally using assistance information (ASSTINFO) from a base station side. Furthermore, AI/ML model training and validation may be performed separately by the client node.

In a third example, DL Tx-Rx beam pair prediction in the spatial domain may be performed by a client and a base station by using separate AI/ML models at the client node and the base station. The base station and the client node may be configured to predict a preferred DL Tx-Rx beam pair. For example, the ML model at the client node may be configured for a preferred Rx beam prediction and the ML model at the base station may be configured for a preferred Tx beam prediction. The predictions may be configured to happen sequentially or simultaneously with coordination among the client node and base station.

Further, new indications related to at least one of the base station or the client node (depending on an example implementation form) is proposed herein. The indications may relate to at least one of conditions, restrictions and/or capabilities for AI/ML inference operation, including one or more of the following parameters:

In the first example, when the base station is configured to use ASSTINFO for inference by one or more ML models, the base station may be configured to indicate to the client node a list of unnecessary ASSTINFO not used by the ML model. Alternatively, the indication may comprise a list of preferred ASSTINFO to be reported. Hence, the client node may not report the unnecessary ASSTINFOs in future reporting instances.

In addition, or alternatively, the base station may be configured to indicate to the client node a new periodicity of non-ML based CSI-RS measurement and reporting after the inference. A non-ML based CSI-RS measurement may refer to a normal CSI-RS measurement wherein no prediction functionality using ML is applied. These measurements may be used for model performance monitoring. Based on model monitoring procedures, the model performance may be evaluated. For example, the periodicity of CSI-RS reporting can be impacted and increased if the model monitoring confirms good performance. An example of parameter for model monitoring comprises prediction accuracy used for subspace selection as described herein. For example, client node location, client node distance from base station, client node velocity, or history of previous model monitoring may cause the periodicity of CSI-RS measurement and reporting to be changed based on caused changes on the prediction accuracy.

In the second example, when the client node uses ASSTINFO for inference by one or more ML models, the client node may be configured to trigger/indicate a list of unnecessary ASSTINFO not used by the ML model, asking the base station not to configure/transmit the unnecessary ASSTINFO for the client node. Alternatively, the indication may comprise a list of preferred ASSTINFO to be reported. The lists may be based on the ASSTINFO to be used by the client node for inference.

In addition, or alternatively, the client node may be configured to trigger/indicate a new periodicity of non-ML based DL Tx beamforming. Measurements based on the new periodicity may be used for model performance monitoring as already described.

In the third example, the base station and/or client node may be configured to trigger/indicate a list of unnecessary ASSTINFO not used by the respective ML model and, thus, no to be reported.

Further, at least one of a non-ML CSI-RS measurement (for the ML inference performed at the base station), a non-ML DL Tx beam measurement (for the ML inference performed at the client node), and/or periodicity of the respective measurement for model monitoring may be indicated by the client node to the base station, or vice versa for the model performance monitoring.

Next, a model training/inference framework is proposed for the spatial beam prediction. At least one of the client node or the base station may be configured to create and select subspaces for ML training/inference based on available ASSTINFO received from the base station and/or the client node. In general, a subspace may comprise a subset of given information, such as a vector space that is entirely contained within another vector space. A subspace may comprise possible features (in this case ASSTINFO) from the entire available dataset. For example, a subspace may comprise a part of features and/or information types from a given dataset that includes a desired subset of ASSTINFO. Further, the client node and/or the base station may be configured to evaluate the selected subspace. Based on the selected subspaces, the client node and/or the base station may be configured to decide whether to use none/some/all of the available ASSTINFO in ML inference phase as inputs to the used ML model. Based on the used subspaces and ASSTINFO, CSI-RS measurement and reporting periodicity may be determined to be increased/decreased and indicated by the base station to the client node (in case of the first example). Alternatively, or in addition, DL Tx transmission periodicity may be determined to be increased/decreased and indicated by the client node to the base station (in case of the second example). FIG. 1 illustrates an example of the proposed framework.

Training of a ML model may consider a large dataset obtained by at least one of the base station or the client node at an operation 100. The dataset may comprise a mix of samples associated with different ASSTINFO. The associated ASSTINFO may correspond to ASSTINFO reported by the client node or the base station.

At an operation 102, the client node and/or the base station may be configured to create a plurality of subspaces based on the dataset obtained at 100. For example, K subspaces 104 may be created based on the number of ASSTINFO over the initial relatively large dataset.

For example, the creation of subspaces from the available training dataset may be based on each subspace comprising one possible ASSTINFO parameter or a combination of ASSTINFO parameters reported by the client node and/or base station. In case of the first example, if there are three available ASSTINFO (N=3, where N denotes the number of available ASSTINFO), e.g., client node positioning (P), beam shape (S), and client node orientation (O), K=8 possible subspaces can be considered as {( ), (P), (S), (O), (P, S), (P, O), (S, O), (P, S, O)}.

A training dataset including L1-RSRP or beam ID, which may be used as main training data for spatial domain beam prediction, can be added to each subspace including ASSTINFO for training the corresponding ML models.

Further, subspace filtering may be used by the client node and/or the base station to filter-out some subspaces. In the subspace filtering, environmental and/or propagation aspects and application properties may be considered. For example, UE position and UE angle for DL Tx beam prediction may be used to update the subspaces to be considered. For example, some combinations of ASSTINFO types may not be needed if only one of the ASSTINFO types can be enough for performing the spatial predictions, without a need to use both. Hence, when K subspaces are created, some of the subspaces comprising ASSTINFO which may not give any additional value for the spatial prediction may be filtered out to reduce the amount of K subspaces. At least one of the base station or the client node may be configured to reduce the number of configured subspaces by excluding one or more of the multiple assistance information parameters based on the excluded assistance information giving similar information than one of the other multiple assistance information parameters.

At an operation 106, the base station and/or the client node may be configured to perform subspace selection from the created K subspaces 104 for ML training and/or inference. The subspace selection may be based on considerations wherein for each training or test sample, M subspaces 108 are selected in the training or inference phase.

For example, M out of total K number of subspaces may be randomly selected uniformly or non-uniformly based on predefined selection probabilities. The predefined selection probability for each subspace can be updated, for example, based on model learning or based on an RL (reinforcement learning) learning model with a configured reward function.

For example, the M subspaces 108 out of the total K subspaces 104 may be randomly selected and trained by each corresponding ML model. The client node and/or the base station may be configured to perform ML inferences at operations 110 with respect to each selected training subspace. The ML model inference 110 may be performed considering input(s) 112, 114 to the model. The inputs may comprise, for example, L1-RSPR measurements 112 and received ASSTINFO 114. The inputted ASSTINFO may be associated with the subspace. If ASSTINFO associated with a subspace is not available, the corresponding ML model may be omitted.

Based on the inference results, the client node and/or the base station may be configured to select an output 120 at an operation 116 among all the obtained output results 118. The following options are examples of output selection procedures that can be considered. For example, hard voting may be used for the output selection 116, which hard voting entails picking the predicted output (e.g., beam ID) with the highest number of votes out of selected subspaces. Alternatively, soft voting may be used, which entails averaging over the probabilities of predicted outputs (e.g., beam IDs) in the considered models. The output (e.g., beam ID) with the highest average probability may be selected as the final output at 120.

Any modification on the selected subspace 108 may be dependent on the model evaluation. New subspaces may be selected by the client node and/or the base station based on changes in the environment as the subspace selection may be an ongoing process.

Figure 2:
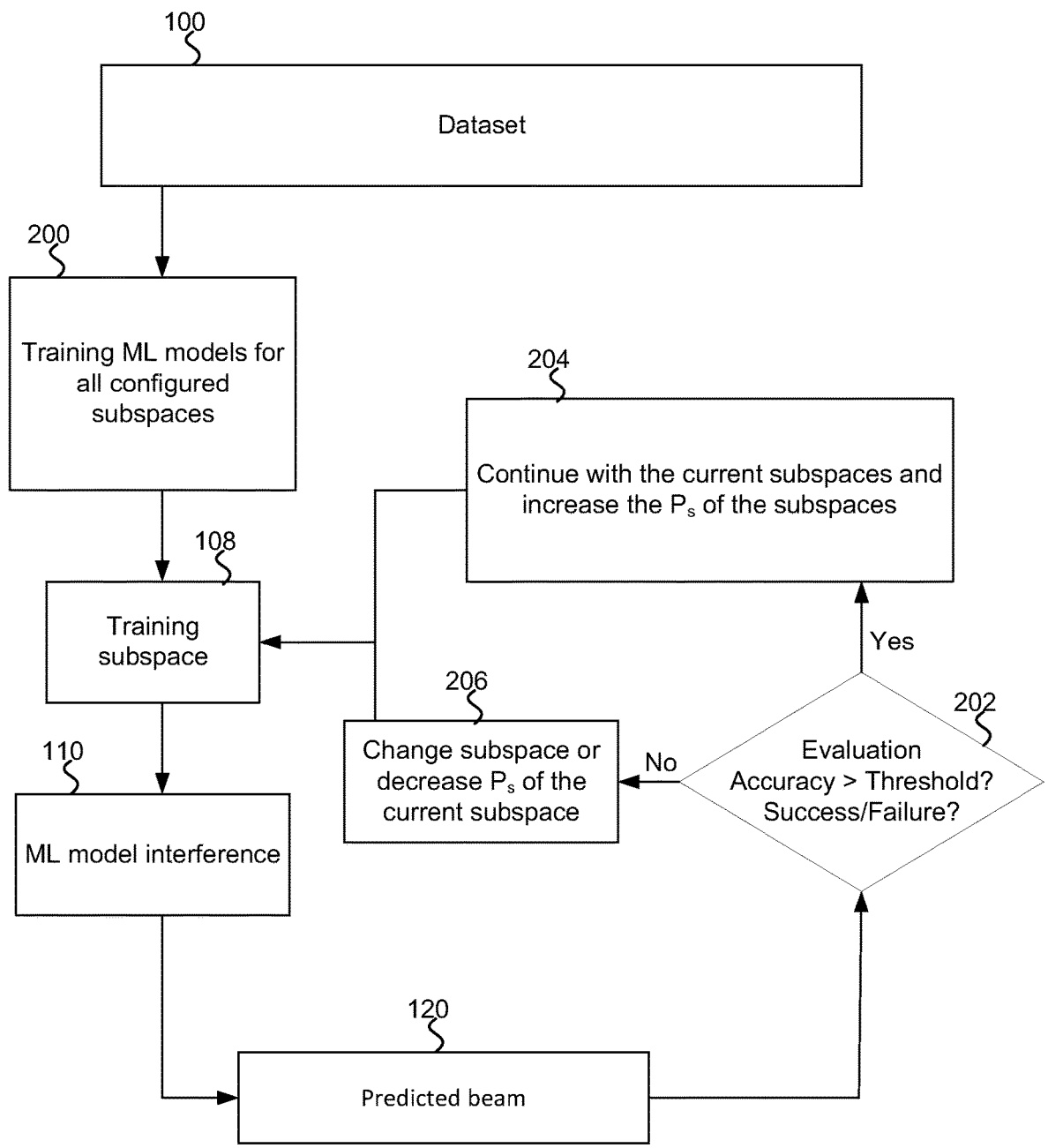
FIG. 2 illustrates an example of determining beam prediction accuracy using a selected subspace as a training set including one or more assistance information parameters, according to an example embodiment.

FIG. 2 depicts an example of selecting a subspace and its evaluation via a predefined threshold for prediction accuracy using output selection methods describe herein.

After the subspaces are created based on the initial dataset 100, corresponding ML models may be trained based on the subspaces at operation 200. Based on reported ASSINFO, a subset of the subspaces may be selected as subspaces 108 for further training. After ML model interference at 110, the client node and/or the base station may be configured to evaluate the selected output 120 for spatial beam prediction at 202. The evaluation may be based on the threshold for prediction accuracy and/or the connection status (failure/success of the connection). If beam prediction accuracy based on the selected output (e.g., average L1-RSRP with 1 dB difference) is above the threshold, inference of the ML models at 110 may be determined by the client node and/or the base station at 204 to continue using the same subspaces 108 as before. If the beam prediction accuracy is less than the threshold, selection probability ($P_S$) of corresponding subspace may be decreased, or the subspace may be changed by the client node and/or the base station at 206 after a specified number of samples.

Figure 3:
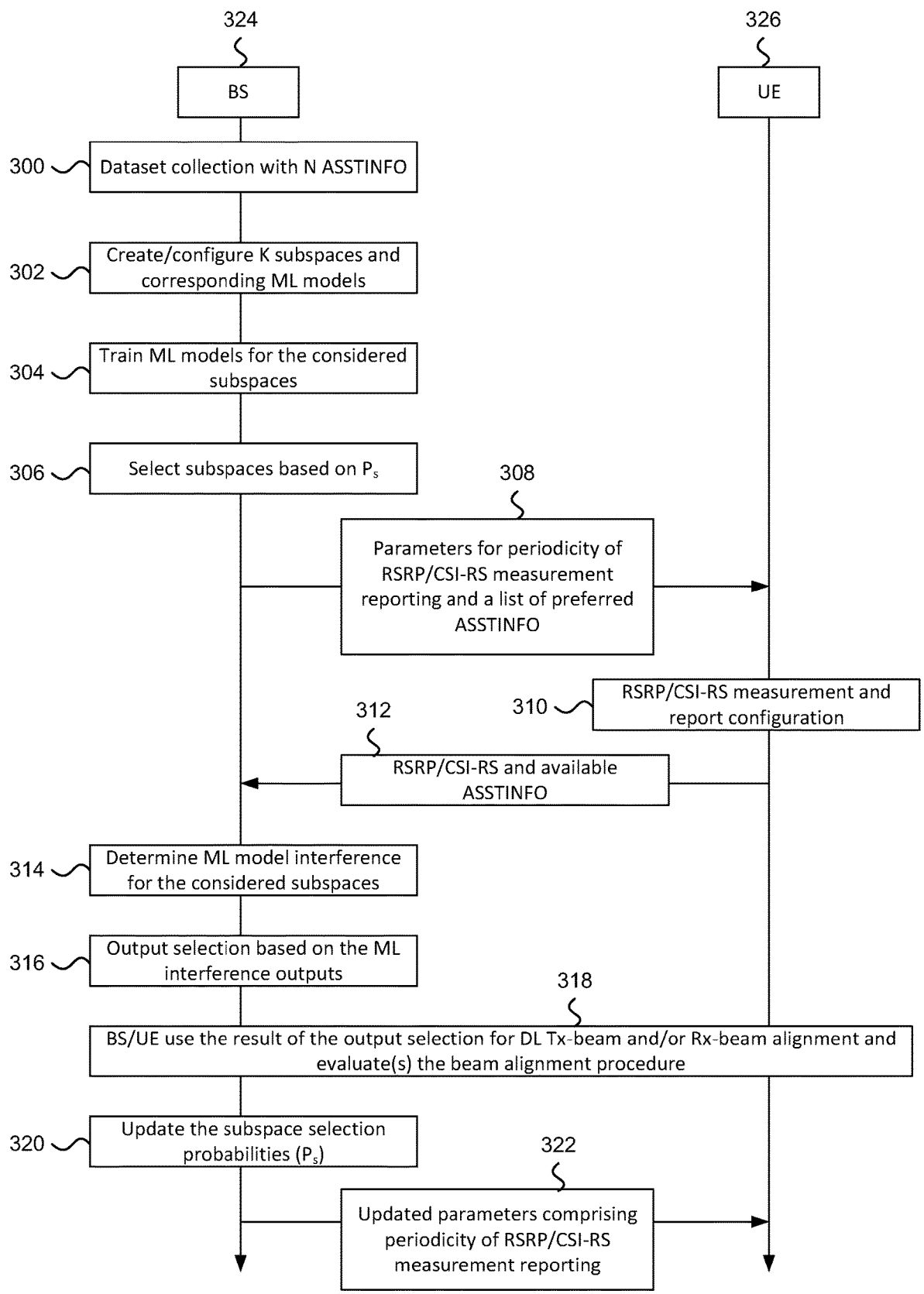
FIG. 3 illustrates an example flowchart for spatial beam prediction by a base station based on assistance information parameters obtained from a client node according to an example embodiment.

FIG. 3 illustrates an example flowchart for determining spatial beam prediction by a base station according to an example embodiment.

At 300, training dataset collection with N ASSTINFO may be performed by the base station (BS) 324. The dataset collection may be performed by the base station offline.

At 302, the base station 324 may be configured to initiate or create K subspaces. Further, the base station 324 may be configured to create corresponding ML models for spatial beam prediction with multiple ASSTINFO parameters. In the subspace creation phase at 302, all the available ASSTINFO in the collected dataset may be taken into account by the base station 324, as each subspace may need the dataset for training the corresponding ML model The number of configured subspaces may depend on the number of assistance information parameters in the collected dataset. Further, the base station 324 may be configured to filter out one or more assistance information parameters based on giving similar information that can be obtained based on one or more of the other assistance information parameters. Consequently, the number of configured subspaces may be reduced. The base station 324 may be further configured to determine an output selection scheme.

At 304, the base station 324 may be configured to train all the considered ML models using the dataset pre-collected at 302. The training may be performed offline by the base station 324.

At 306, the base station 324 may be configured to select M out of the K subspaces based on selection probabilities (P s) of the subspaces. The selection probabilities may be predefined, and the selection probabilities may be updated later on based on how accurate prediction results are obtained with the selected subspaces.

At 308, the base station 324 may configure a client node, such as UE 326, by indicating a requirement of reporting multiple ASSTINFO parameters. The multiple ASSTINFO parameters may be based on the ASSTINFO comprised in the dataset. The configuration may comprise, for example, at least one of a list of preferred ASSTINFO parameters to be reported, resources for reporting or a reporting periodicity of the ASSTINFO measurements. The list of preferred ASSTINFO may be associated with the ASSTINFO comprised in the selected subspaces. The configuration may further comprise parameters for reporting beam measurements, such as resources for reporting and/or a reporting periodicity of RSRP and/or CSI-RS measurements.

At 310, the UE 326 may be configured to measure the beams configured by the base station at 308, for example, via RSRP/CSI-RS measurements.

At 312, the UE 326 may be configured to transfer the measured (RSRP/CSI-RS) data and available ASSTINFO to the base station 324.

At 314, the base station 324 may be configured to execute the ML models for the considered subspaces. If the requested ASSTINFO for some subspaces are not available (e.g., not shared by the UE 326), the base station 324 may be configured to skip the corresponding ML model. Inputs for the ML models may comprise the beam measurements and the available ASSTINFO received from the UE 326.

At 316, the base station 324 may be configured to determine a final beam prediction to be proposed. The final beam prediction may be based on the configured output selection scheme at 302. The final beam prediction may be determined by the base station 324 based on the ML model outputs, for example, by combining beam prediction results of the ML model outputs from operation 314.

At 318, at least one of the base station 324 or the UE 326 may use the proposed final beam prediction for DL Tx-beam and/or Rx-beam alignment. The base station 324 and/or UE 326 may be further configured to evaluate the beam alignment procedure based on at least one of a connection status (success/failure) and a quality of the connection link.

At 320, the base station 324 may be configured to update the selection probabilities P s of the subspaces based on the evaluation outputs of the base station 324 at 318. Based on the updated selection probabilities, the selected subset of subspaces may change.

At 322, the base station 324 may be configured to update at least one of the resources for reporting or the reporting periodicity. The resources and/or periodicity for reporting may be updated based on the updated subset of subspaces. The base station 324 may be configured to signal the updated reporting parameters to the UE 326, such as the periodicity for reporting RSRP/CSI-RS measurements.

Figure 4:
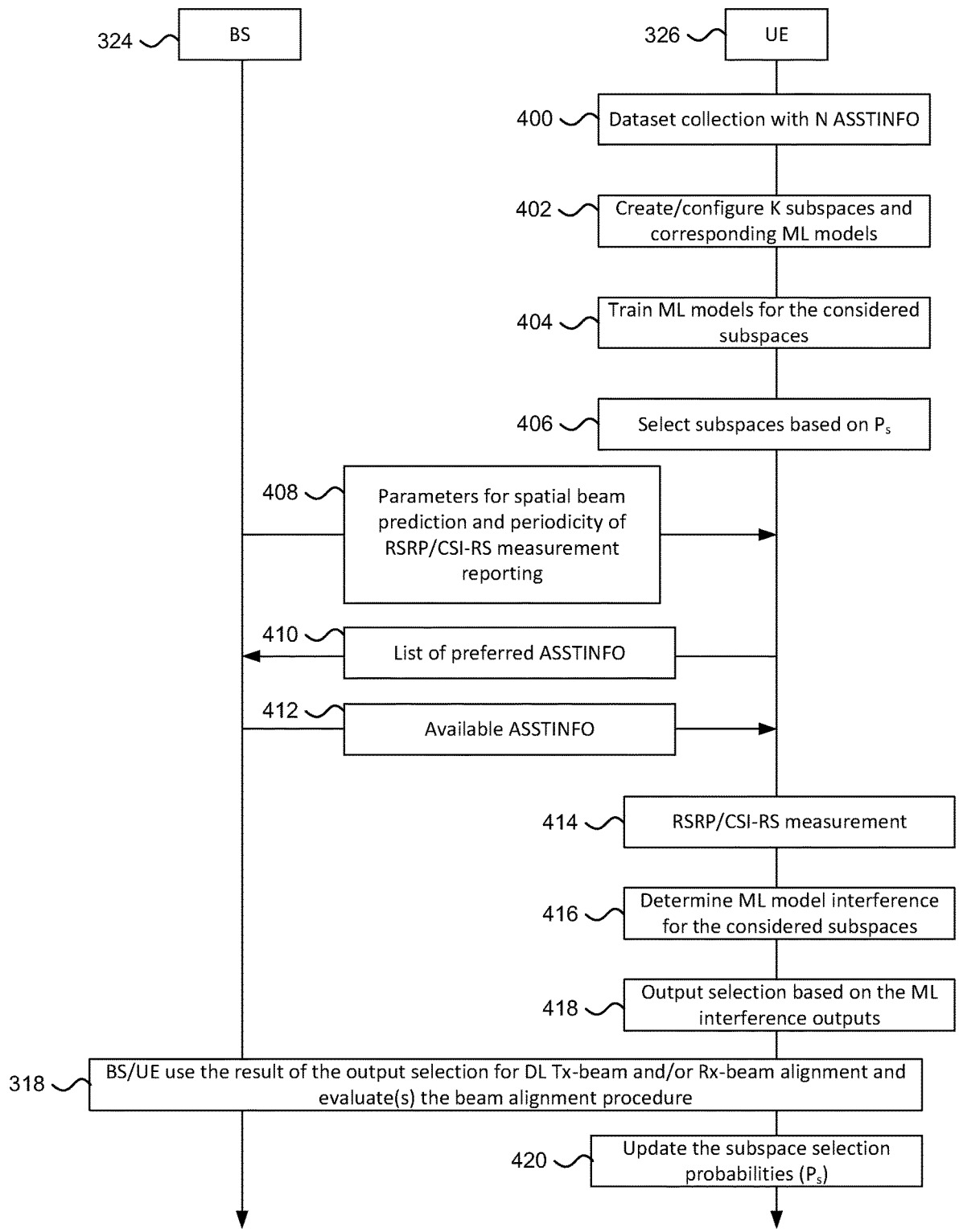
FIG. 4 illustrates an example flowchart for spatial beam prediction by a client node based on assistance information parameters obtained from a base station according to an example embodiment.

FIG. 4 illustrates an example flowchart for determining spatial beam prediction by a client node according to an example embodiment. The client node may be, for example, a UE 326.

At 400, training dataset collection with N ASSTINFO may be performed by the UE 326. The dataset collection may be performed by the UE offline.

At 402, the UE 326 may be configured to initiate or create K subspaces. Further, the UE 326 may be configured to create corresponding ML models for spatial beam prediction with multiple ASSTINFO parameters. The ASSTINFO parameters may relate to a base station 324. In the subspace creation phase at 402, available ASSTINFO in the collected dataset may be taken into account by the UE 326, as each subspace may need the dataset for training the corresponding ML model. The number of configured subspaces may depend on the number of assistance information parameters in the collected dataset. Further, the UE 326 may be configured to filter out one or more assistance information parameters based on giving similar information that can be obtained based on one or more of the other assistance information parameters. Consequently, the number of configured subspaces may be reduced. The UE 326 may be further configured to determine an output selection scheme.

At 404, the UE 326 may be configured to train all the considered ML models using the dataset pre-collected at 402. The training may be performed offline by the UE 326.

At 406, the UE 326 may be configured to select M out of the K subspaces based on selection probabilities (P s) of the subspaces. The selection probabilities may be predefined, and the selection probabilities may be updated later on based on how accurate prediction results are obtained with the selected subspaces.

At 408, the base station 324 may configure the UE 326 by indicating beam prediction related parameters to the UE 326 in a signal. The beam prediction related parameters may comprise at least one of resources for reporting or a reporting periodicity of beam measurements, such as RSRP and/or CSI-RS measurements.

At 410, the UE 326 may be configured to send to the base station 324 a requirement of reporting multiple ASSTINFO parameters from the base station 324. The multiple ASSTINFO to be reported may be based on the ASSTINFO comprised in the collected dataset. The UE 326 may also send a list of preferred ASSTINFO to be reported. The list of preferred ASSTINFO may be associated with the ASSTINFO comprised in the selected subspaces.

At 412, the UE 326 may be configured to receive, from the base station 324, available ASSTINFO parameters measured by the base station 324.

At 414, the UE 326 may be configured to measure the beams configured by the base station at 408, for example, via RSRP/CSI-RS measurements. For example, measurement of a second set of beams out of a first set of beams may be performed by the UE 326 at 414, depending on the configuration.

At 416, the UE 326 may be configured to execute the ML models for the considered subspaces. If the requested ASSTINFO for some subspaces are not available (e.g., not shared by the base station 324), the UE 326 may be configured to skip the corresponding ML model. Inputs for the ML models may comprise the beam measurements performed by the UE 326 and the available ASSTINFO received from the base station 324.

At 418, the UE 326 may be configured to determine a final beam prediction to be proposed. The final beam prediction may be based on the configured output selection scheme at 402. The final beam prediction may be determined by the UE 326 based on the ML model outputs, for example, by combining beam prediction results of the ML model outputs from operation 416.

At 318, at least one of the base station 324 or the UE 326 may use the proposed final beam prediction for DL Tx-beam and/or Rx-beam alignment. The base station 324 and/or UE 326 may be further configured to evaluate the beam alignment procedure based on at least one of a connection status (success/failure) and a quality of the connection link.

At 420, the UE 326 may be configured to update the selection probabilities P s of the subspaces based on the evaluation outputs of the UE 326 at 318. Based on the updated selection probabilities, the selected subset of subspaces may be changed.

Figure 5:
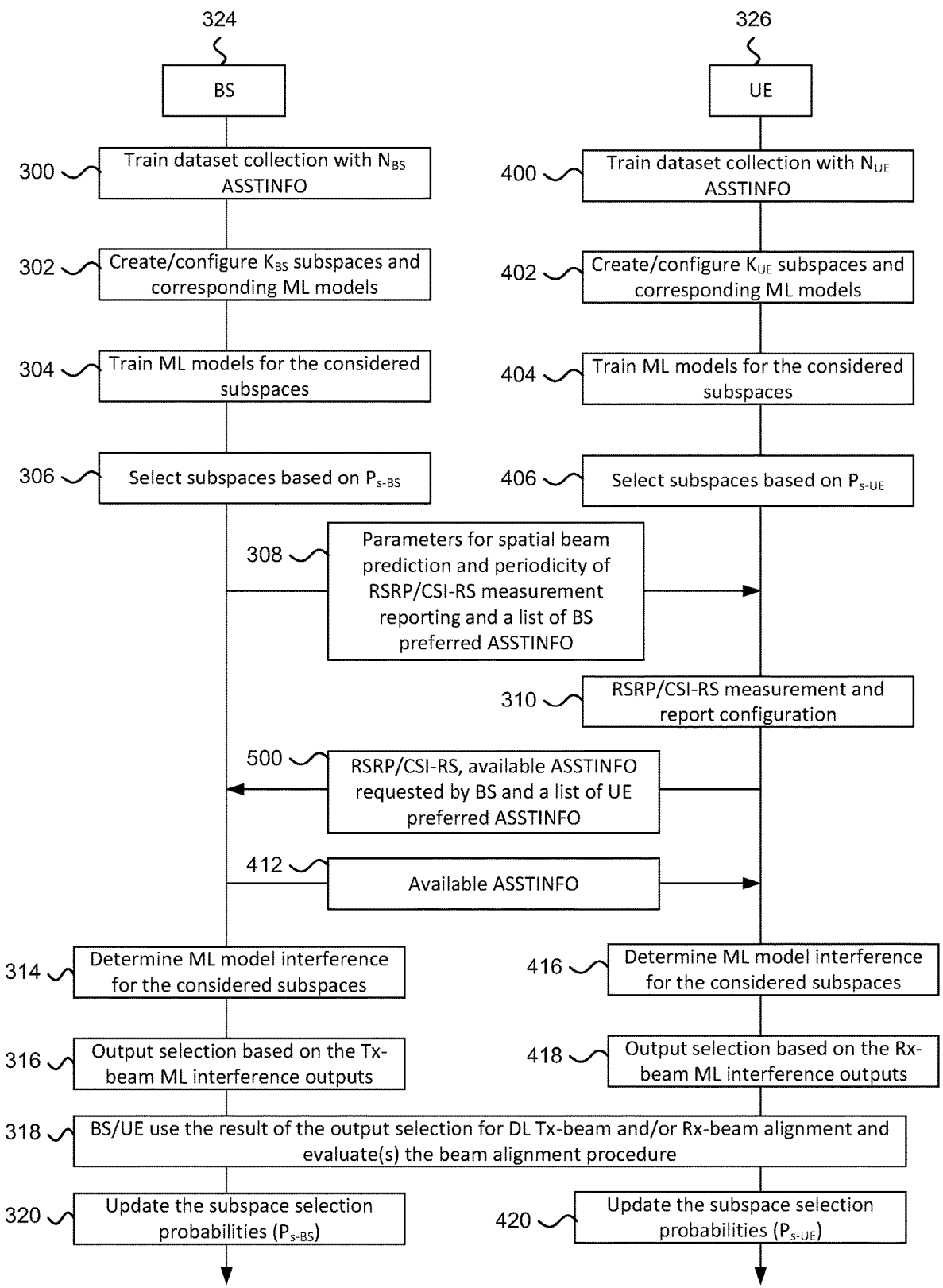
FIG. 5 illustrates an example flow chart for spatial beam prediction by a base station and a client node according to an example embodiment.

FIG. 5 illustrates an example flowchart for determining spatial beam prediction by both a base station and a UE. Initial operations 300, 400, 302, 402, 304, 404, 306, and 406 correspond to the operations with like references described at FIGS. 3 and 4, and are not repeated herein.

At 308, the base station 324 may configure the UE 326 by indicating beam prediction related parameters to the UE 326. The configuration may comprise a requirement of reporting multiple ASSTINFO parameters. The beam prediction related parameters may comprise at least one of a list of preferred ASSTINFO parameters to be reported, resources for reporting or a reporting periodicity of measurements, such as RSRP and/or CSI-RS measurements.

At 310, the UE 326 may be configured to measure the beams configured by the base station at 308, for example, via RSRP/CSI-RS measurements.

At 500, the UE 326 may be configured to transfer to the base station 324 the measured (RSRP/CSI-RS) data, available ASSTINFO requested by the base station 324 and a list of ASSTINFO requested by the UE 326.

At 412, the UE 326 may be configured to receive, from the base station 324, available ASSTINFO parameters measured by the base station 324.

At 314 and 416, the base station 324 and the UE 200 may be configured to execute their ML models for the considered subspaces. If the requested ASSTINFO for some subspaces are not available (e.g., not shared by the base station 324 or the UE 326), the corresponding ML models may be skipped.

At 316 and 418, based on the configured output selection scheme determined by the base station 324 at 302 and by the UE 326 at 402, the beam prediction results of the M subspace ML model outputs may be combined to propose final beam prediction at the base station 324 and the UE 326, respectively.

At 318, the base station 324 and the UE 326 may use the respective proposed final beam predictions for DL Tx-beam and/or Rx-beam alignment. The base station 324 and UE 326 may be further configured to evaluate the beam alignment procedure based on at least one of a connection status (success/failure) and a quality of the connection link between the UE 326 and the base station 324.

At 320, the base station 324 may be configured to update the selection probabilities $P_s$ for subspaces based on the evaluation outputs of the base station 324 at 318.

At 420, the UE 326 may be configured to update the selection probabilities P s based on the evaluation outputs of the UE 326 at 318.

Figure 6:
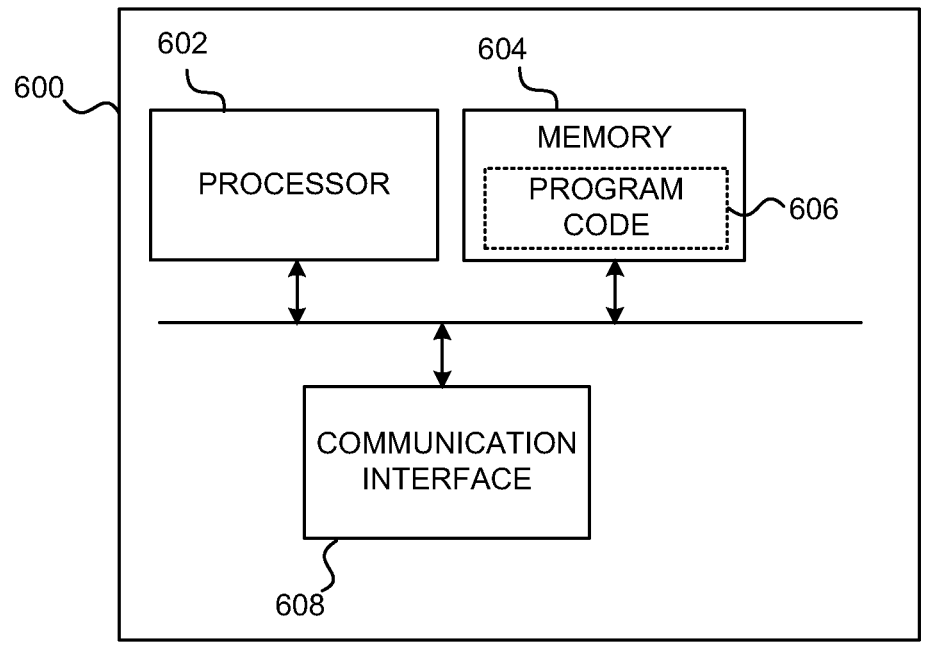
FIG. 6 illustrates an example of an apparatus configured to practice one or more example embodiments.

FIG. 6 illustrates an example of an apparatus 600 configured to practice one or more example embodiments. In an embodiment, the apparatus 600 may be a client node, such as for example the UE 326. In an embodiment, the apparatus 600 may be a network node. The network node may be, for example, the base station 324, such as a gNB. Although illustrated as a single device it is appreciated that, wherever applicable, functions of apparatus 600 may be distributed to a plurality of devices. For example, the apparatus 600 may comprise a distributed computing system coupled to a remote radio head.

The apparatus 600 may comprise at least one processor 602. The at least one processor 602 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 600 may further comprise at least one memory 604. The memory 604 may be configured to store, for example, computer program code 606 or the like, for example operating system software and application software. The memory 604 may comprise one or more volatile memory devices, one or more non-volatile memory devices, and/or a combination thereof. For example, the memory 604 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 600 may further comprise one or more communication interfaces 608 configured to enable apparatus 600 to transmit information to other devices, such as to a base station or a client device. The communication interface 608 may be further configured to receive information from other devices, such as from a base station or a client device. The communication interface 608 may be configured to provide at least one wireless radio connection, such as for example a 3GPP mobile broadband connection (e.g. 3G, 4G, 5G). However, the communication interface 204 may be configured to provide one or more other type of connections, for example a wireless local area network (WLAN) connection such as for example standardized by IEEE 802.11 series or Wi-Fi alliance; a wired connection such as for example a local area network (LAN) connection or an optical network connection, or the like; or a wired Internet connection. The communication interface 608 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

When the apparatus 600 is configured to implement some functionality, some component and/or components of the apparatus 600, such as for example the at least one processor 602 and/or the memory 604, may be configured to implement this functionality. Furthermore, when the at least one processor 602 is configured to implement some functionality, this functionality may be implemented using computer program code 606 comprised, for example, in the memory 604.

For example, the apparatus 600 may be configured to create and select subspaces from an obtained dataset based on available ASSTINFO. The apparatus 600 may be configured to request multiple ASSTINFO parameters, such as ASSTINFO preferred by the apparatus based on the selected subspaces, from a device the apparatus is communicatively coupled to. After receiving ASSTINFO measured by the coupled device, the apparatus may be configured to determine a preferred spatial beam prediction based on outputs of ML models corresponding to the selected subspaces and executed based on the received ASSTINFO. Further, the apparatus 600 may be configured to determine at least one of DL Tx and/or Rx beam alignment based on the preferred spatial beam prediction.

The functionality described herein may be performed, at least in part, by one or more computer program product components such as software components. According to an embodiment, the apparatus 600 comprises a processor or processor circuitry, such as for example a microcontroller, configured by the computer program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 600 may be configured to perform or cause performance of any aspect of the method(s) described herein. Further, a computer program may comprise instructions for causing, when executed by a processor, the apparatus 600 to perform any aspect of the method(s) described herein. Further, the apparatus 600 may comprise means for performing any aspect of the method(s) described herein. According to an example embodiment, the means comprises the at least one processor, and the at least one memory including instructions, the at one memory and the instructions configured to, when executed by the at least one processor, cause performance of any aspect of the method(s).

Figure 7:
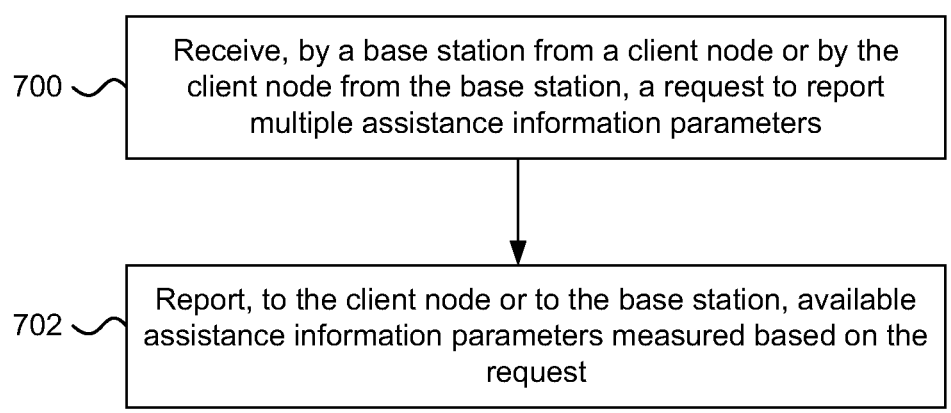
FIG. 7 illustrates an example of a method for assisting in spatial beam prediction according to an example embodiment.

FIG. 7 illustrates an example of a method for assisting in spatial beam prediction according to an example embodiment.

At 700, the method may comprise receiving, by a base station from a client node or by the client node from the base station, a request to report multiple assistance information parameters.

At 702, the method may comprise reporting, to the client node or to the base station, available assistance information parameters measured based on the request.

Figure 8:
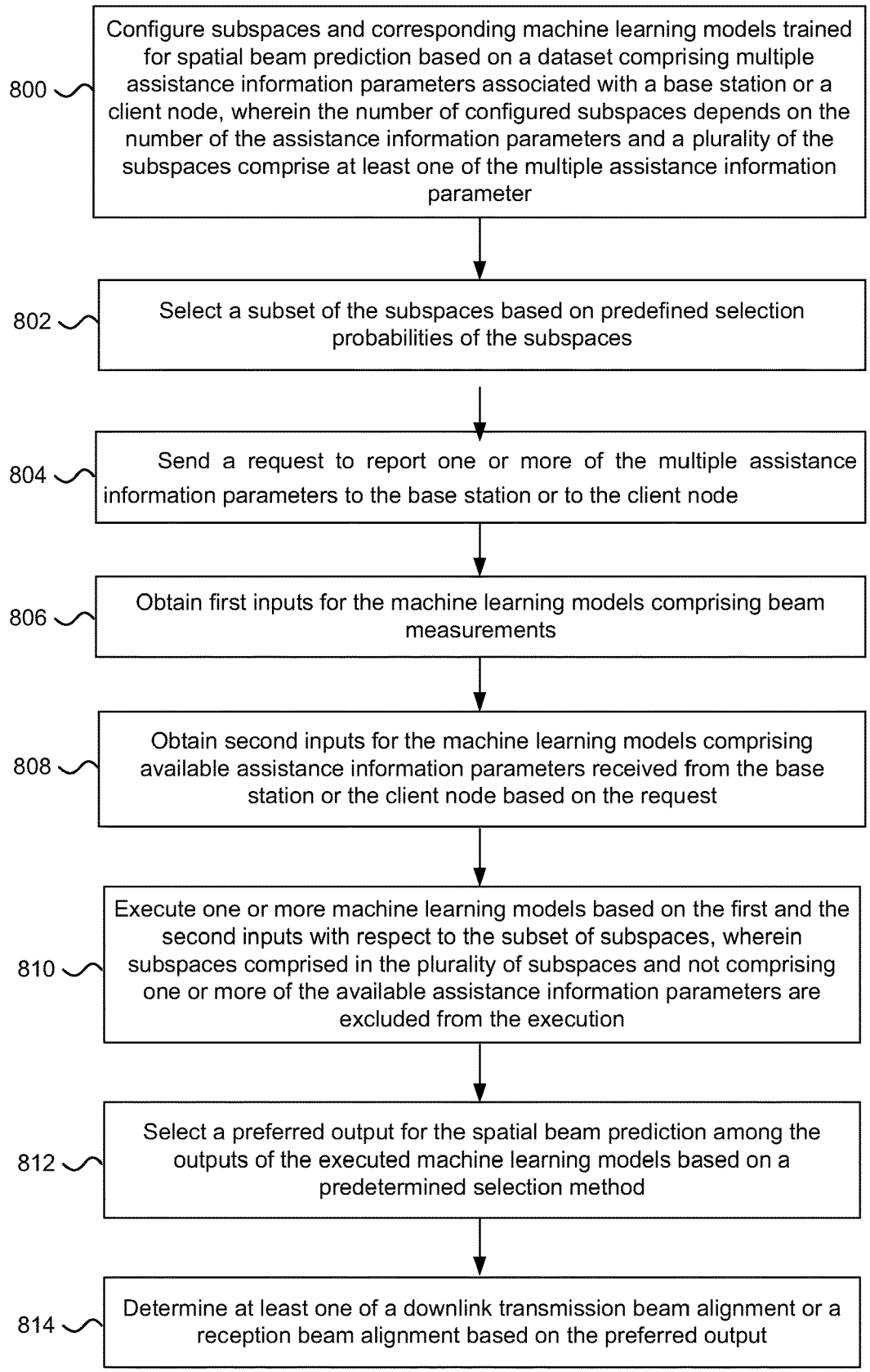
FIG. 8 illustrates an example of a method for performing spatial beam prediction according to an example embodiment.

FIG. 8 illustrates an example of a method for performing spatial beam prediction according to an example embodiment.

At 800, the method may comprise configuring subspaces and corresponding machine learning models trained for spatial beam prediction based on a dataset comprising multiple assistance information parameters associated with a base station or a client node, wherein the number of configured subspaces depends on the number of the assistance information parameters and a plurality of the subspaces comprise at least one of the multiple assistance information parameters.

At 802, the method may comprise selecting a subset of the subspaces based on predefined selection probabilities of the subspaces.

At 804, the method may comprise sending a request to report one or more of the multiple assistance information parameters to the base station or to the client node.

At 806, the method may comprise obtaining first inputs for the machine learning models comprising beam measurements.

At 808, the method may comprise obtain second inputs for the machine learning models comprising available assistance information parameters received from the base station or the client node based on the request.

At 810, the method may comprise executing one or more machine learning models based on the first and the second inputs with respect to the subset of subspaces, wherein subspaces comprised in the plurality of subspaces and not comprising one or more of the available assistance information parameters are excluded from the execution.

At 812, the method may comprise selecting a preferred output for the spatial beam prediction among the outputs of the executed machine learning models based on a predetermined selection method.

At 814, the method may comprise determining at least one of a downlink transmission beam alignment or a reception beam alignment based on the preferred output.

Further features of the methods directly result from the functionalities and parameters of the apparatuses, as described in the appended claims and throughout the specification and are therefore not repeated here. It is noted that one or more operations of the method may be performed in different order.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. An apparatus, comprising:
   at least one processor; and
   at least one memory comprising instructions which, when executed by the at least one processor, cause the apparatus at least to:
   configure subspaces and corresponding machine learning models trained for spatial beam prediction based on a dataset comprising multiple assistance information parameters associated with a base station or a client node, wherein a number of the configured subspaces is based on a number of the multiple assistance information parameters, and wherein a plurality of the configured subspaces comprise at least one of the multiple assistance information parameters;
   select a first subset of the configured subspaces based on predefined selection probabilities of the configured subspaces;
   send a request to report one or more of the multiple assistance information parameters to the base station or to the client node;
   obtain first inputs for the machine learning models, wherein the first inputs comprise beam measurements;
   obtain second inputs for the machine learning models, wherein the second inputs comprise available assistance information parameters received from the base station or the client node based on the request;
   execute one or more machine learning models based on the first inputs and the second inputs for the selected first subset of the configured subspaces, wherein subspaces comprised in the plurality of configured subspaces and not comprising one or more of the available assistance information parameters are excluded from the execution;
   select a preferred output for the spatial beam prediction among outputs of the executed machine learning models based on a predetermined selection method; and
   determine at least one of a downlink transmission beam alignment or a reception beam alignment based on the preferred output.

2. The apparatus of claim 1, wherein the apparatus comprises the base station and wherein the at least one memory further comprises instructions which, when executed by the at least one processor, cause the apparatus to:
   send, to the client node, a configuration comprising parameters for the beam measurements and the request; and wherein
   the first inputs and the second inputs are received from the client node based on the configuration.

3. The apparatus of claim 1, wherein the apparatus comprises the base station and the request is sent to the client node via a radio resource control (RRC).

4. The apparatus of claim 1, wherein the apparatus comprises the client node, the request is sent to the base station, and the beam measurements are performed by the client node.

5. The apparatus of claim 1, wherein the request comprises a list of preferred assistance information parameters to be reported, wherein the list of preferred assistance information parameters is determined based on the selected first subset of the plurality of subspaces.

6. The apparatus of claim 1, wherein the at least one memory further comprises instructions which, when executed by the at least one processor, cause the apparatus to:
   determine a prediction accuracy of the spatial beam based on a connection status and a quality of link of the downlink transmission beam alignment and the reception beam alignment;
   compare the prediction accuracy to a predefined threshold;
   update the predefined selection probabilities of the configured subspaces by decreasing the predefined selection probability of subspace corresponding to the selected preferred output when the prediction accuracy is below the predefined threshold and by increasing the predefined selection probabilities of the subspaces in the first subset of the configured subspaces when the prediction accuracy is equal to or above the predefined threshold; and
   reselect a second subset of the configured subspaces based on the updated predefined selection probabilities of subspaces.

7. The apparatus of claim 1, wherein the number of configured subspaces is reduced by excluding one or more of the multiple assistance information parameters providing similar information to one of the multiple assistance information parameters.

8. A computer-implemented method, comprising:
   configuring subspaces and corresponding machine learning models trained for spatial beam prediction based on a dataset comprising multiple assistance information parameters associated with a base station or a client node, wherein a number of the configured subspaces is based on a number of the multiple assistance information parameters, and wherein a plurality of the configured subspaces comprise at least one of the multiple assistance information parameters;
   selecting a first subset of the subspaces based on predefined selection probabilities of the configured subspaces;
   sending a request to report one or more of the multiple assistance information parameters to the base station or to the client node;
   obtaining first inputs for the machine learning models, wherein the first inputs comprises beam measurements;
   obtaining second inputs for the machine learning models, wherein the second inputs comprises available assistance information parameters received from the base station or the client node based on the request;
   executing one or more machine learning models based on the first inputs and the second inputs for the selected first subset of the configured subspaces, wherein subspaces comprised in the plurality of configured subspaces and not comprising one or more of the available assistance information parameters are excluded from the execution;

selecting a preferred output for the spatial beam prediction among outputs of the executed machine learning models based on a predetermined selection method; and determining at least one of a downlink transmission beam alignment or a reception beam alignment based on the preferred output.

9. The method of claim 8, further comprising:

determining a prediction accuracy of the spatial beam based on a connection status and a quality of link of the downlink transmission beam alignment and the reception beam alignment;

comparing the prediction accuracy to a predefined threshold;

updating the predefined selection probabilities of the configured subspaces by decreasing the predefined selection probability of subspace corresponding to the selected preferred output when the prediction accuracy is below the predefined threshold and by increasing the predefined selection probabilities of the subspaces in the first subset of the configured subspaces when the prediction accuracy is equal to or above the predefined threshold; and reselecting a second subset of the configured subspaces based on the updated predefined selection probabilities of subspaces.

* * * * *